Dec. 17, 1935.  C. W. STONE  2,024,953
ELECTRIC TRANSLATING CIRCUITS AND METHOD OF OPERATING THE SAME
Filed Nov. 26, 1932
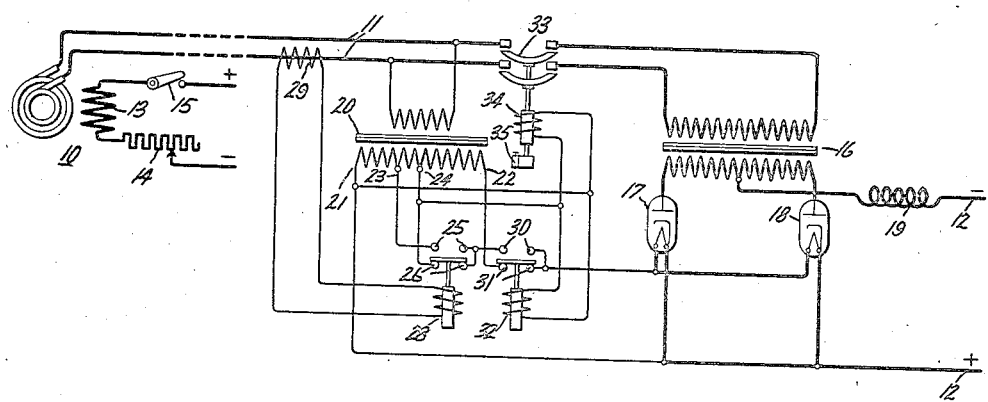
Inventor:
Charles W. Stone,
by Charles E. Tuller
His Attorney.

Patented Dec. 17, 1935

2,024,953

UNITED STATES PATENT OFFICE 2,024,953

ELECTRIC TRANSLATING CIRCUITS AND METHOD OF OPERATING THE SAME

Charles W. Stone, Schenectady, N. Y., assignor to General Electric Company, a corporation of New York Application November 26, 1932, Serial No. 644,469

9 Claims. (Cl. 175—363)

My invention relates to electric translating circuits and a method of operating the same, and more particularly to such circuits including one or more electric valves for controlling the flow of energy from a source of current to a load circuit.

In the operation of electric translating circuits including electric valves of the hot cathode type, it is well known that it is desirable to keep the cathodes of the electric valves at substantially constant temperature irrespective of the operating conditions of the electric translating circuit. This requirement gives rise to certain operating problems; for example, in case the cathodes of the electric valves are heated from the source of current and the voltage of the source falls substantially below its normal value, the energization of the cathodes of the valves will correspondingly be decreased, and may fall below a satisfactory operating value. On the other hand, in case the load transmitted by the electric translating circuit is subject to wide variations, under heavy load conditions current flowing through the electric valve or valves produces a heating effect which tends to raise the temperature of the cathodes of the valves above its normal value and thus to shorten their life. In particular, it is often desirable to energize a load circuit directly from a source of current through one or more electric valves without other circuit controlling apparatus. If, at the time the source is connected to the electric translating circuit, its voltage is approximately at its normal value, the surge of load current through the electric valves may be sufficiently large to have destructive effects on the valves and other parts of the circuit apparatus. On the other hand, in case the voltage of the source is reduced when picking up the load on the circuit, the energization of the cathodes of the electric valves will be substantially below normal and insufficient for satisfactory operation of the valves. My invention is directed more specifically to an improved electric translating circuit for meeting these operating conditions.

It is an object of my invention, therefore, to provide an improved electric translating circuit including an electric valve for controlling the flow of energy from a source of current to a load circuit which will satisfy the above mentioned requirements and which will be simple and reliable in operation.

It is another object of my invention to provide an improved electric translating circuit including a hot cathode electric valve for controlling the flow of energy from a source of current to a load circuit in which the energization of the cathode of the electric valve will be maintained within predetermined limits irrespective of variations of circuit conditions.

It is another object of my invention to provide an improved electric translating circuit including a hot cathode electric valve for controlling the flow of energy from a source of current to a load circuit, in which the cathode of the valve is energized from the source through a voltage ratio adjusting means, the ratio of which is controlled in response to the voltage of the translating circuit.

It is a further object of my invention to provide an improved electric translating circuit including a hot cathode electric valve for controlling the flow of energy from a source of current to a load circuit in which the cathode is heated from the source through a voltage ratio adjusting means effective to change its ratio in response to the magnitude of the current transmitted in the electric translating circuit.

It is a still further object of my invention to provide an improved method of picking up load on a circuit energized from a source of current through an electric valve having a heated cathode by means of which the load current may be brought up to its normal value without abnormal current surges, and by means of which the cathode energization may be maintained within predetermined limits.

In accordance with one embodiment of my invention, energy is transmitted from a source of alternating current to a direct current load circuit through an electric translating circuit including one or more electric valves. The electric valves are of the heated cathode type, the cathodes of which are energized from the source of current through a voltage ratio adjusting means, such, for example, as a tap changing transformer. The taps of the cathode transformer are arranged to be controlled jointly in response to current and voltage conditions on the electric translating circuit to maintain the energization of the cathode of the electric valve within predetermined limits.

In accordance with another feature of my invention, such electric translating circuit is operated to pick up load on the load circuit by first reducing the voltage of the source substantially below its normal value, delaying the connection of the load circuit to the source until after the cathodes of the valves reach a satisfactory operating temperature, raising the voltage of the source to increase the energization of the load circuit, simultaneously decreasing the ratio of the voltage adjusting means when the voltage of the circuit has reached a predetermined value and still further decreasing the ratio of the voltage adjusting means when the current transmitted by the circuit exceeds a predetermined value.

For a better understanding of my invention, together with other and further objects thereof, reference is had to the following description taken in connection with the accompanying drawing and its scope will be pointed out in the appended claims. The single figure of the drawing illustrates an electric translating circuit, by means of which my invention may be carried out, for transmitting energy from a single phase source of alternating current to a direct current load circuit.

Referring now more particularly to the drawing, there is illustrated an arrangement for transmitting energy from a source of alternating current illustrated as a synchronous generator 10 over an electric translating circuit 11 to a direct current load circuit 12. The generator 10 is preferably provided with means for controlling its voltage, as for example, by energizing its field winding 13 from a source of direct current through a variable resistor 14 and switch 15. Interposed between the electric translating circuit 11 and the direct current circuit 12 is a rectifying apparatus comprising a transformer 16, provided with a primary winding connected to the circuit 11 and a secondary winding having an electrical midpoint connected to one side of the direct current circuit and end terminals connected to the other side of the direct current circuit through electric valves 17 and 18. A current smoothing reactor 19 may be connected in series with the direct current circuit 12, if desired. Electric valves 17 and 18 are each provided with an anode and a heated cathode and may be of any of the several types well known in the art, although I prefer to use valves of the vapor electric discharge type. The valves 17 and 18 are illustrated as of the indirectly heated cathode type, in which the cathode and cathode heater are separate, although it will be well understood that valves of the directly heated cathode type may be used if desired.

In order to control the energization of the cathode heaters in accordance with electrical conditions obtaining on the translating circuit 11, the cathode heaters of the electric valves 17 and 18 are connected to be energized from the circuit 11 through a transformer 20, the secondary winding of which is provided with end terminals 21 and 22 and intermediate terminals 23 and 24. The cathode heaters of the electric valves 17 and 18 may be selectively energized from any of the several terminals of the secondary winding of the transformer 20 through contacts 25 or 26 of a relay 28, the coil of which is energized in accordance with the current in the circuit 11 by means of a series transformer 29, and contacts 30 and 31 of a relay 32, the coil of which is energized in accordance with the voltage of the circuit 11 through the transformer 20. A circuit controller 33 is preferably interposed in the connections to the above described rectifying apparatus and is provided with an operating coil 34 energized in accordance with the voltage of the circuit 11 through the transformer 20 and with a time delay mechanism 35 to insure that the cathodes of the electric valves 17 and 18 shall have reached a proper operating temperature before a load is placed upon the apparatus.

In explaining the operation of the above described apparatus, it will be assumed that initially switch 15 is in its open position so that no voltage is applied to the alternating current circuit 11. Consequently, the coils 28, 32 and 34 are deenergized, the relays 28 and 32 are in their illustrated positions, and the contacts of the circuit controller 33 are open. Switch 15 is now closed and the variable resistor 14 adjusted to supply a voltage to the circuit 11 substantially below normal. For example, a voltage approximately twenty-five percent of normal may be found satisfactory. Such a voltage will be insufficient to pick up the relay 32 energized from the circuit 11 through terminals 21 and 24 of the transformer 20. With the contacts 26 and 31 of the relays 28 and 32, respectively, closed, cathode heaters of the electric valves 17 and 18 are energized across the terminals 21 and 22 of the transformer 20. The voltage ratio of the full secondary winding of the transformer 20 to the primary winding is such that in spite of the reduced voltage obtaining on the alternating current circuit 11, normal voltage is supplied to the cathode heaters of the electric valves 17 and 18 to bring them up to normal operating temperature. After a predetermined time delay, dependent upon the thermal characteristics of the cathode heaters, the operating coil 34 closes the circuit controller 33 to connect the rectifying apparatus to the electric translating circuit. In view of the fact that the circuit 11 is energized at approximately one quarter voltage, the rectifying apparatus may pick up any connected load on the direct current circuit 12 without an excessive inrush current, which would otherwise tend to damage electric valves 17 and 18. The voltage of the generator 10 is now gradually raised to its normal value and, when it reaches approximately that value, the relay 32 will pick up to close its contacts 30 and connect the cathode heaters of the electric valves 17 and 18 between the terminals 21 and 24 which have a voltage sufficient to energize the cathode heaters under normal operating voltages on the circuit 11.

It is well understood in the art that a heavy load current flowing in the electric valves 17 and 18 supplies considerable heat to their cathodes and tends to raise their operating temperature above normal. In order to compensate for this effect, when the load current exceeds a predetermined value the relay 28 will operate to close its contacts 25 and connect the cathode heaters between the terminals 21 and 23 of the transformer 20. The reduced voltage thus applied to the cathode heaters of the electric valves 17 and 18 is sufficient to maintain approximately normal operating temperature under increased load conditions. Obviously, in case the voltage on the alternating current circuit 11 should fall, due to abnormal load conditions or other faults, the relay 32 will again become deenergized and close its contacts 31 thus raising the voltage applied to the cathode heaters of the electric valves 17 and 18 to insure that they are maintained at a proper operating temperature.

While I have illustrated an arrangement for changing the energization of cathode heaters of electric valves in a single step by means of a single relay responsive to voltage and a single relay responsive to current, it will be obvious to those skilled in the art that this change of energization may be taken in a plurality of steps by means of a plurality of relays responsive to successively increasing values of current and voltage, respectively.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An electric translating circuit comprising a source of current, a load circuit, means including an electric valve for controlling the flow of energy from said source to said load circuit, said valve being provided with a heated cathode, and means for heating said cathode and maintaining its temperature within predetermined limits comprising multiple tap voltage ratio adjusting means for heating said cathode from said source, and means responsive to variations in an electrical condition of said translating circuit tending to produce variations in the cathode temperature for changing the taps of said voltage ratio adjusting means to compensate for the effect of such variations on the temperature of said cathode.

2. An electric translating circuit comprising a source of alternating current, a load circuit, means including an electric valve for controlling the flow of energy from said source to said load circuit, said valve being provided with a heated cathode, a transformer energized from said source for supplying heating current to said cathode, said transformer being provided with a winding having a plurality of electrically spaced terminals, and means for maintaining the temperature of said cathode within predetermined limits comprising means responsive to variations in the voltage of said source for changing the connections to said terminals to compensate for said variations in voltage.

3. An electric translating circuit comprising a source of alternating current, a load circuit, means including an electric valve for controlling the flow of energy from said source to said load circuit, said valve being provided with a heated cathode, a transformer energized from said source for supplying heating current to said cathode, said transformer being provided with a winding having a plurality of electrically spaced terminals, and means for maintaining the temperature of said cathode within predetermined limits comprising current responsive means for changing the connections to said terminals to decrease the heating current of said cathode when the current transmitted by said valve exceeds a predetermined value and voltage responsive means for increasing the heating current of said cathode when the voltage applied to said valve falls below a predetermined value.

4. An electric translating circuit comprising a source of alternating current, a load circuit, means including an electric valve for controlling the flow of energy from said source to said load circuit, said valve being provided with a heated cathode, a transformer energized from said source for supplying heating current to said cathode, said transformer being provided with a winding having a plurality of electrically spaced terminals, means for changing the connections to said terminals to reduce the cathode heating current when the voltage of said source rises above a predetermined value, and other means for changing the connections to said terminals to further reduce the cathode heating current when the current transmitted by said valve exceeds a predetermined value.

5. An electric translating circuit comprising a source of alternating current, a load circuit, an electric valve interconnecting said source and said load circuit, said valve being provided with a heated cathode, a cathode heating transformer having a multiple tap secondary winding, and means for maintaining the temperature of said cathode within predetermined limits comprising relay means for changing the tap connections of said transformer in response to variations in the voltage of said source and other relay means for changing the tap connections of said transformer in response to variations in the current transmitted by said valve, said relay means cooperating to vary the energization of said cathode to compensate for the effect of said variations in voltage and current of the circuit on the temperature of said cathode.

6. An electric translating circuit comprising a source of alternating current, a load circuit, means including an electric valve interconnecting said source and said load circuit, said valve being provided with a heated cathode, transformer means for heating said cathode from said source, circuit controlling means interposed between said source and said valve, means for maintaining said circuit controlling means in an open position for an interval after the energization of said translating circuit to permit said cathode to reach an operating temperature, and means responsive to an electrical condition of said translating circuit for controlling the ratio of transformation of said transformer means.

7. The method of picking up load on a circuit energized from a source of current through an electric valve having a heated cathode energized from said source through a voltage ratio adjusting device, which comprises reducing the voltage of said source substantially below normal, connecting the load to said source, raising the voltage of said source to increase the energization of the load circuit, and decreasing the ratio of said voltage adjusting device to prevent overheating of the cathode of the valve.

8. The method of picking up load on a circuit energized from a source of current through an electric valve having a heated cathode energized from said source through a voltage ratio adjusting device, which comprises reducing the voltage of said source substantially below its normal value, connecting the load to said source after a time delay sufficient for said cathode to reach an operating temperature, raising the voltage of said source to increase the energization of the load circuit, and decreasing the ratio of said voltage adjusting device to prevent overheating of the cathode of the valve.

9. The method of picking up load on a circuit energized from a source of current through an electric valve having a heated cathode energized from said source through a voltage ratio adjusting device, which comprises reducing the voltage of said source substantially below its normal value, connecting the load to said source, raising the voltage of said source to increase the energization of the load circuit, simultaneously decreasing the ratio of said voltage adjusting device, and further decreasing the ratio of said voltage adjusting device when the load current exceeds a predetermined value.

CHARLES W. STONE.